(12) United States Patent
Perlman (10) Patent No.: US 6,769,129 B1
(45) Date of Patent: Jul. 27, 2004

(54) SYSTEM AND METHOD FOR DETECTING AND RESOLVING IR REMOTE SIGNAL CONFLICTS

(75) Inventor: Stephen G. Perlman, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/270,363

(22) Filed: Mar. 16, 1999

(51) Int. Cl.[7] ............................................. H04N 7/18
(52) U.S. Cl. ....................... 725/80; 725/153; 348/734
(58) Field of Search ........................ 725/81, 133, 141, 725/153, 109, 68, 131, 139, 151, 80, 82; 348/734, 552; 359/142; 398/106, 173–181, 117; 340/825.69; 370/315

(56) References Cited

U.S. PATENT DOCUMENTS

| | | | |
|---|---|---|---|
| 5,365,282 A | * 11/1994 | Levine | 348/734 |
| 5,420,647 A | * 5/1995 | Levine | 348/734 |
| 5,550,642 A | * 8/1996 | Kim et al. | 386/46 |
| 5,894,278 A | * 4/1999 | Kubo et al. | 340/825.72 |
| 6,549,719 B2 | * 4/2003 | Mankovitz | 386/83 |

* cited by examiner

Primary Examiner—Chris Grant
Assistant Examiner—Timothy M. Murphy
(74) Attorney, Agent, or Firm—Workman Nydegger (57) ABSTRACT

Systems and methods for detecting and resolving interference between two IR signals in a remote control system. The two IR signals may include primary signals emitted from a remote control device to a first consumer electronics device and relayed signals sent from the first consumer electronics device to a second consumer electronics device using an IR blaster, or emitter. In order to minimize the likelihood of interference between the signals at the second consumer electronics device, the IR emitter does not begin transmitting the relayed signals until the primary signals are no longer being emitted. If, however, the remote control device begins to send another primary signal while the IR emitter is sending the relayed signals, the systems and methods include provisions for resolving any data loss that may result. Upon sensing the interference, the IR emitter sends a reset signal that places the secondary consumer electronics device in a known state. Next, the IR emitter sends the previously transmitted relayed signals, including the one that was interfered with and those that were lost due to the reset signal.

27 Claims, 5 Drawing Sheets

SYSTEM AND METHOD FOR DETECTING AND RESOLVING IR REMOTE SIGNAL CONFLICTS

BACKGROUND OF THE INVENTION

1. The Field of the Invention

The present invention relates to systems and methods for controlling a consumer electronics device using a remote control device. More specifically, the present invention is directed to systems and methods for detecting and resolving interference between two infrared signals, wherein the first infrared signal is emitted from a remote control device to a first consumer electronics device and the second infrared signal is emitted from a signal relay device connected to the first consumer electronics device and sent to a second consumer electronics device.

2. The Prior State of the Art

Remote control devices for controlling functions on consumer electronics devices, such as televisions, have become widely accepted over the years. Remote control devices allow a viewer to change television channels, adjust volume, and control other features of the television without having to have to walk to the television set. As VCRs, cable boxes, and other components of home entertainment systems have proliferated, the value, number of features, and variety of remote control devices have increased.

With the increasing complexity of home entertainment systems, so called universal remote controls have been developed. Universal remote controls are capable of controlling functions of two or more consumer electronic devices. For example, many universal remote control devices can be used with televisions, VCRs, and cable boxes. In order to configure the universal remote control to be compatible with a particular type of VCR, for example, the user may enter an alphanumeric code to the remote control, thereby programming the remote control device to emit the appropriate signals for the particular make and model of the VCR.

Although universal remote controls have been quite popular, they have experienced some limitations. In particular, universal remote controls are typically self-contained devices containing code that is executed to select the particular infrared signal configurations compatible with selected consumer electronic devices. The code contained in the remote control device is generally not upgradable. Thus, when a user obtains a consumer electronic device not supported by the universal remote control there is typically no way of upgrading the remote control device short of purchasing a more sophisticated one. In addition, since remote control devices are typically battery-powered, including too many features and functions therein may cause the batteries to rapidly discharge.

Figure 1:
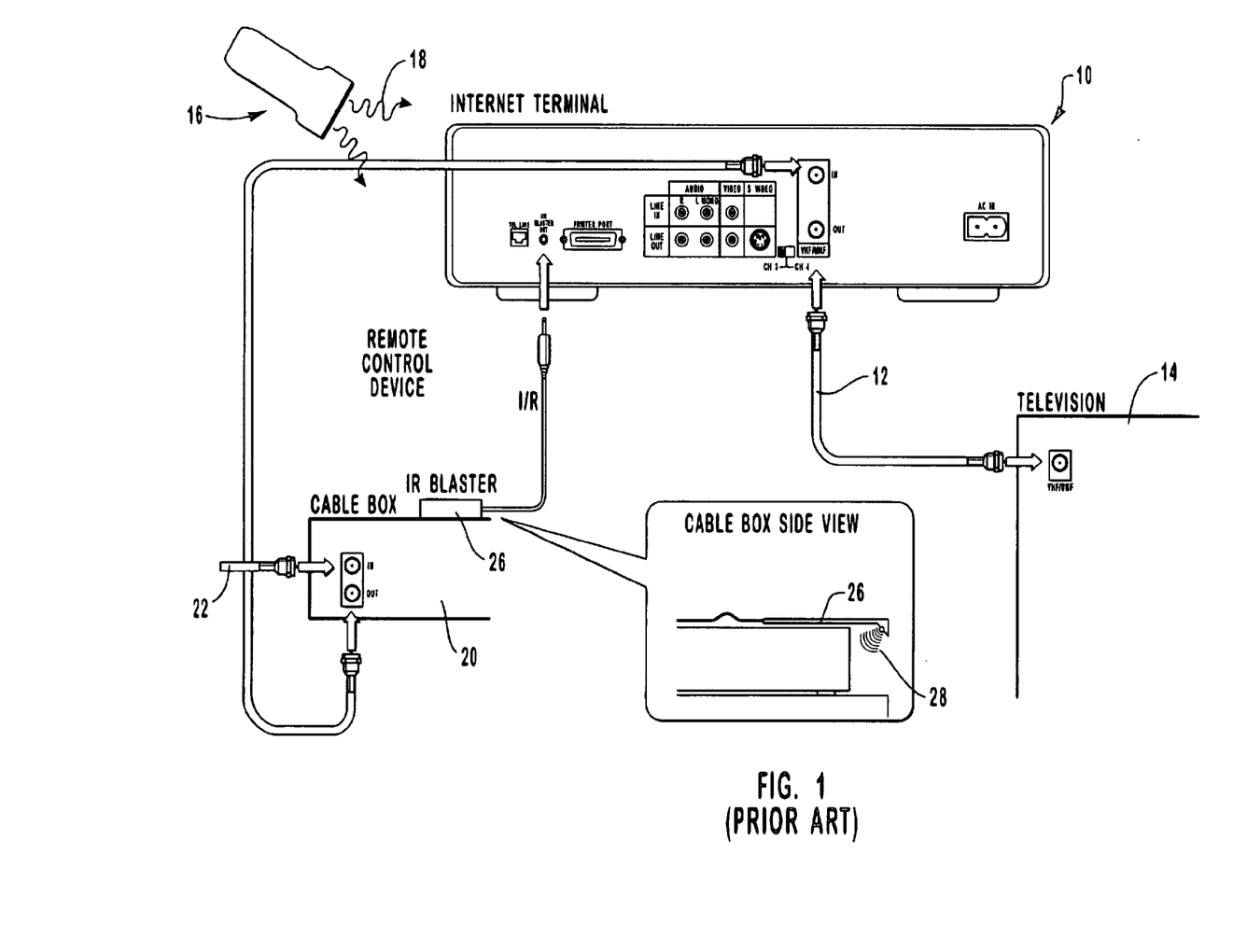
FIG. 1 illustrates a standard configuration for connecting an Internet terminal, a television, and a cable box so that a remote control device can control both the Internet terminal and the cable box.

FIG. 1 illustrates a remote control system that has been developed to allow a remote control device to be used with new consumer electronic devices and with electronics equipment produced by new manufacturers. The remote control system of FIG. 1 provides a degree of flexibility that has not been possible with simple universal remote control devices. One example of the remote control system of FIG. 1 is seen in WebTV set-top boxes (Internet terminals) manufactured by WebTV Networks, Inc., of Palo Alto, Calif. Internet terminal 10 is connected, by coaxial cable 12 or by another cable system to television 14. Remote control device 16 emits infrared signals 18, which are received at an infrared receiver (not shown) at Internet terminal 10. Infrared signals 18 may control selected functions at Internet terminal 10 and, optionally, at television 14. Another consumer electronics,device, which in this example is cable box 20, is connected to Internet terminal 10. Cable box 20 receives cable television programming via coaxial cable 22 and descrambles the cable television programming if necessary. The cable television programming signals may then be sent from cable box 20 to Internet terminal 10 and in turn to television 14 using coaxial cable 12 and 22, respectively.

In order for remote control device 16 to control cable box 20, information encoded in primary IR signals 18 is processed in Internet terminal 10 and sent from the Internet terminal to IR blaster 26 positioned near an IR receiver 28 at the cable box. Occasionally, infrared signals 18 emitted from remote control device 16 interfere with infrared signals 28 emitted from IR blaster 26. Such signal collision introduces the risk that cable box 20 will not execute the desired function. This risk is especially present when multiple signals are transmitted from remote control display 16 in rapid succession. For example, in order to tune to a selected television channel using cable box 20, a user may be required to enter three consecutive digits representing the channel number. It is possible that a signal 18 encoding the second digit may collide with a signal 18 encoding the first digit. In this situation, the user cannot be certain that cable box 20 has responded to the first digit because the cable box was simultaneously exposed again to the second digit emitted from remote control device.

In particular situations, such as that described above in reference to FIG. 1, IR signal interference and collision present a limitation in what is otherwise a very useful remote control system. The remote control system using infrared blaster 26 illustrated in FIG. 1 has the advantage of being readily updated to be compatible with consumer electronic devices produced by new manufacturers and with entirely new consumer electronic devices. In particular, the software in Internet terminal 10 for controlling the format, the speed, and other properties of the infrared signals 28 emitted from IR blaster 26 can be updated as needed.

In view of the foregoing, there is a need in the art for systems of resolving interference between two infrared signals in a remote control system. More specifically, it would be an advancement in the art to provide a system for reliably relaying signals to consumer electronic devices using infrared blasters so that multiple consumer electronic devices may be controlled by a single remote control device regardless of any infrared signal collisions.

SUMMARY AND OBJECTS OF THE INVENTION

The present invention is directed to systems and methods for detecting interference between two simultaneous infrared signals in a remote control system and for resolving such interference. According to the invention, information encoded in an infrared signal received from a remote control device is not relayed through an infrared blaster to a second consumer electronics device until the first consumer electronics device determines that no more signals are being sent from the remote control device. In this manner, the infrared blaster begins transmitting in the absence of competing signals from the remote control device. If the first consumer electronics device determines that an interfering signal is emitted from the remote control device while the IR blaster is transmitting information to the second consumer electronics device, the method of invention includes provisions for resolving this interference.

When the collision is detected after the IR blaster begins to transmit its signal, the IR blaster is caused to transmit a reset signal to the consumer electronics device. The reset signal places the second consumer electronics device at a known state in preparation for retransmitting the infrared signal. The reset signal may be any signal that causes the consumer electronics device to go to a known state. In one example, the reset signal is a channel up or channel down code that causes the consumer electronics device, such as a cable box, to be set to a selected television channel. This type of reset code is useful when the command that was being sent during the interference was a multi-digit number associated with a television channel.

Once the reset signal has been received at the consumer electronics device, the Internet terminal and the IR blaster retransmit information that was lost at the consumer electronics device by the reset signal and the information encoded in the infrared signal. For example, if the command that was interfered with was a multi-digit code associated with the television channel, the Internet terminal and the IR blaster retransmit the previously sent digits of the television channel. This technique places the consumer electronics device in the condition that it would have been in had there been no interference from signals emitted by the remote control device.

The systems and methods of the invention allow remote control systems having IR blasters to reliably control television channels and other functions of consumer electronic devices regardless of the occurrence of the interference between signals emitted from the IR blaster and signals emitted from the remote control device. Moreover, the invention enables the use of a single IR blaster configured to transmit signals to multiple consumer electronics devices associated with an Internet terminal or another central electronics device. In the absence of the techniques for detecting and resolving IR signal interference disclosed herein, the use of single IR blaster to control multiple devices could relatively frequently subject the multiple consumer electronics devices to the problems traditionally associated with IR signal interference. However, the methods and systems of the invention essentially eliminate the problems that have been previously experienced. The use of a single IR blaster in a home entertainment system can significantly reduce the cost and the complexity of home entertainment systems that include a large number of interconnected consumer electronics devices.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention is directed to systems and methods for detecting interference between two simultaneous infrared signals in a remote control system and for resolving such interference. The invention may be practiced in conjunction with a consumer electronics system having at least a first consumer electronics device and a second electronics device. In order to control the second consumer electronics device with the remote control device, infrared signals are sent from the remote control device to the first consumer electronics device. The signals are then relayed from the first consumer electronics device to the second consumer electronics device via an infrared blaster, or emitter. While the first consumer electronics device may be any desired type of consumer electronics device, an example of Internet terminal is used hereinafter for purposes of illustration.

According to the invention, information encoded in the infrared signal emitted from a remote control device is not relayed through the infrared blaster to the second consumer electronics device until the Internet terminal determines that no more signals are being sent from the remote control device. In this manner, the infrared blaster begins transmitting in the absence of competing signals from the remote control device. If the Internet terminal determines that an interfering signal is emitted from the remote control device while the IR blaster is transmitting information to the consumer electronics device, the method of invention includes provisions for resolving this interference, including retransmitting the information that may have been lost.

The invention is described below by using diagrams to illustrate either the structure or processing of embodiments used to implement the system and method of the present invention. Using the diagrams in this manner to present the invention should not be construed as limiting of its scope. The embodiments of the present invention may comprise a consumer electronics device including a special purpose or general purpose computer including various computer hardware, as discussed in greater detail below.

As used herein, the term "consumer electronics device" is used to refer to any number or type of electronics devices that can be connected to television set, a computer monitor, or another display screen. Such devices include but are not limited to, cable boxes, satellite receivers, VCRs, video game machines, video disk players, home theater equipment, and Internet terminals.

Embodiments within the scope of the present invention include computer-readable media having computer-executable instructions or data fields stored thereon. Such computer-readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired computer-executable instructions or data fields and which can accessed by a general purpose or special purpose computer. Combinations of the above should also be included within the scope of computer readable media.

Computer-executable instructions comprise, for example, instructions and data which cause a general purpose computer, special purpose computer, or special purpose processing device to perform a certain function or group of functions. The computer-executable instructions and associated data fields represent an example of program code means for executing the steps of the invention disclosed herein. In some contexts, the computer-executable instructions will be described as program modules being executed by a computer or processor within a consumer electronics device. Generally, program modules include routines, programs, objects, components, data structures, etc. that perform particular tasks or implement particular abstract data.

Figure 2:
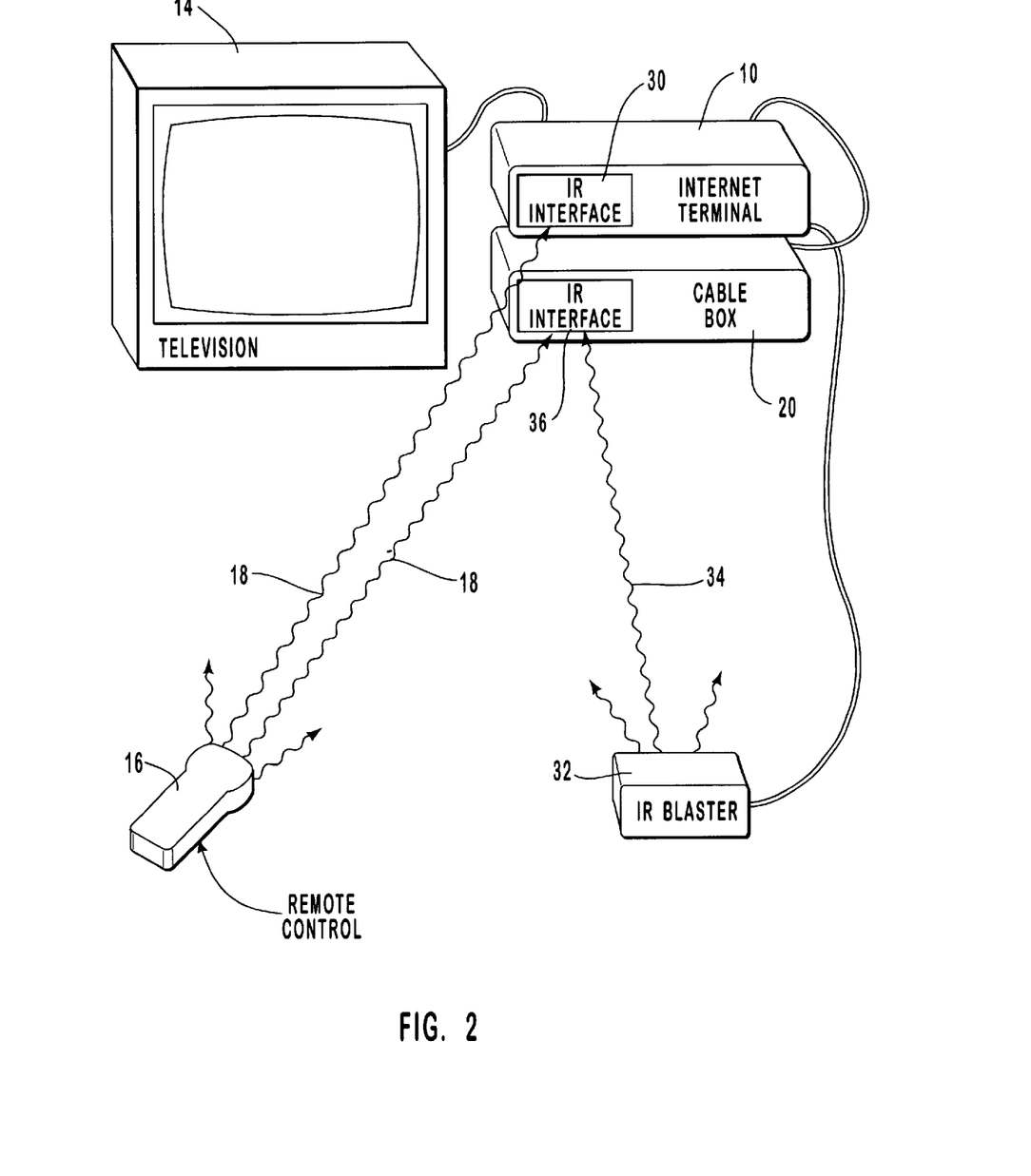
FIG. 2 depicts a connection configuration wherein IR signals from a remote control device and an IR blaster have the potential of interfering with each other.

FIG. 2 illustrates one example of a system that includes interconnected consumer electronic devices wherein IR signals from a remote control device and from an IR blaster have the potential for interfering with one another. In this example, the connections between the various devices illustrated in FIG. 2 are similar to those illustrated in FIG. 1. In particular, Internet terminal 10, which is one example of a first consumer electronics device, is connected to television 14. Although Internet terminal 10 is presented as an example of the first consumer electronics devices of the consumer electronics systems disclosed herein, those skilled in the art will understand that any other type of consumer electronics device could replace Internet terminal 10.

Cable box 20 has been connected to Internet terminal 10 in order to provide television signals to the Internet terminal, which are then transmitted to television 14. Remote control device 16 sends infrared signals 18 to IR interface 30 at Internet terminal 10. Primary IR signals 18 carry encoded commands that are intended to control functions on Internet terminal 10, cable box 20, television 14, or any additional consumer electronics devices.

When primary IR signals 18 carry encoded instructions for controlling functions at cable box 20, the encoded information in the signals is sent from Internet terminal 10 to IR blaster 32, which is a signal relay device for transmitting IR signals from Internet terminal 10 to consumer electronics device 42. In this example, IR blaster 32 comprises an infrared emitter positioned at a site in a room such that signals emitted therefrom reach cable box 20 and any additional consumer electronic devices as desired. Thus, one IR blaster 26 is capable of controlling multiple consumer electronics devices according to this embodiment. Alternatively, however, the invention may be practiced with an IR blaster 26 depicted in FIG. 1 that is specifically associated with a single consumer electronics device. According to this alternative, each additional consumer electronics device is equipped with its own IR blaster 26.

IR blaster 32 emits relayed IR signals 34 that are received at an IR interface 36 at cable box 20. The information encoded in IR signals 34 has a format and a speed compatible with cable box 20. While IR signals 34 are being transmitted, there is the potential for primary IR signals 18, emitted from remote control device 16, to also be received at IR interface 36. Depending on the format of the encoded information of primary IR signals 18 and the timing of their transmission, there exists of a potential of interference between primary IR signals 18 and IR signals 34 at cable box 20. In the absence of the systems and methods of the invention for detecting and resolving IR signal interference, cable box 20 may be unable to correctly receive and respond to the information in IR signals 34. However, according to the invention, at least two techniques are used to ensure that the appropriate information is received at IR interface 36 in a condition such that cable box 20 appropriately responds thereto. First, signals 34 are not sent from IR blaster 32 to IR interface 36 until Internet terminal 10 detects that primary IR signals 18 are no longer being transmitted by remote control device 16. Second, in cases where transmission of primary IR signals 18 begins after relayed IR signal 34 has been initiated, IR blaster 32 is instructed to send a reset signal to cable box 20 to place the cable box in a known state. Subsequently, the information previously transmitted from IR blaster 32 is retransmitted to cable box 20 to replace the information that was lost during the interference and by the reset signal.

Figure 3:
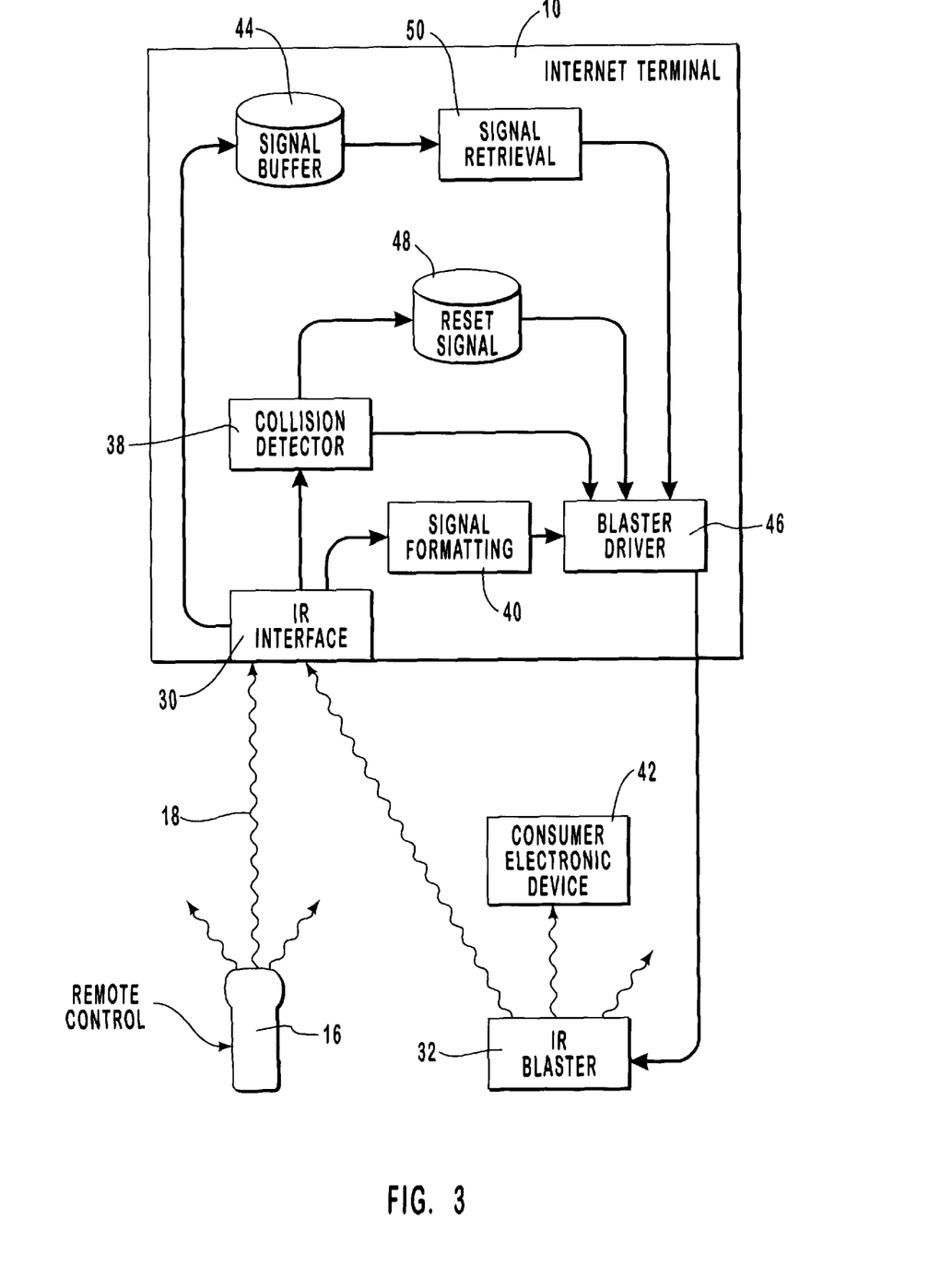
FIG. 3 is a conceptual diagram illustrating features of an Internet terminal for detecting and resolving interference between IR signals.

FIG. 3 is a high-level diagram illustrating selected functions and data structure that detect the presence of IR signal interference and resolve the interference according to one embodiment of the invention. As described herein in reference to FIGS. 1 and 2, remote control device 16 transmits primary IR signals 18 to IR interface 30 of Internet terminal 10. A collision detector 38 at Internet terminal 10 monitors the activity at IR interface 30 to determine when primary IR signals 18 are being transmitted. When signal 18 is received at IR interface 30, the signal is formatted at signal formatting module 40 so that it is appropriately configured to be compatible with consumer electronics device 42, which may be cable box 20 of FIG. 2 or another consumer electronics device.

The information encoded in signals 18 is also stored in a signal buffer 44 of FIG. 3 so that it is available for later retrieval, if necessary. IR blaster driver 46 causes IR blaster 32 to transmit IR signals 34, which carry the information encoded in the most recent primary IR signal 18 anytime after the most recent primary IR signal 18 has terminated as indicated by collision detector 38. In this sense, collision detector 38 is one example of means for determining when the primary signals are no longer being transmitted. In addition, IR blaster driver 46 represents an example of means for initiating transmission of the relayed signals in response to the first consumer electronics device receiving the primary signals. IR blaster 32 begins transmission of relayed IR signal 34 only when remote control device 16 is not transmitting primary IR signals 18. However, there exists the possibility that the user of remote control device 16 will initiate transmission of a subsequent primary IR signal 18 during the period of time of transmission of relayed IR signal 34.

Collision detector 38 also monitors IR interface 30 for a simultaneous reception of primary IR signals 18 and IR signals 34 that occurs, for example, when the user sends a primary IR signal 18 during the period of time that the relayed IR signal 34 is being emitted. In this sense, collision detector 38 is one example of means for detecting when one of the primary signals is being transmitted at the same time that one of the relayed signals is being transmitted. Such simultaneous reception of signals indicates that interference between the signals and loss of encoded information may be experienced at consumer electronics device 42. Accordingly, when collision detector 38 detects such interference, it initiates transmission of a reset signal 48 stored at Internet terminal 10 to IR blaster 32, and in turn to consumer electronics device 42. Reset signal 48 may be any command that causes consumer electronics device 42 to revert to a known state. Examples of reset signals are channel up or channel down signals when the function controlled by remote control device 16 is television channel changing. The computer-readable structure in which reset signal 48 is stored and blaster driver 46 represent one example of means for initiating transmission of the reset signal to the second consumer electronics device.

After consumer electronics device 42 reverts to a known state, a signal retrieval module 50 retrieves from signal buffer 44 the information encoded in the previously sent primary IR signals 18. The retrieved information is then transmitted to IR blaster 32, and in turn to consumer electronics device 42. Thus, signal retrieval module 50, in combination with IR blaster driver 46, represents an example of retransmission means for retransmitting the relayed signals when the primary signals are no longer being transmitted. In this manner, the systems of the invention transmit the desired command to consumer electronics device 42 regardless of the occurrence of IR signal interference.

Figure 4:
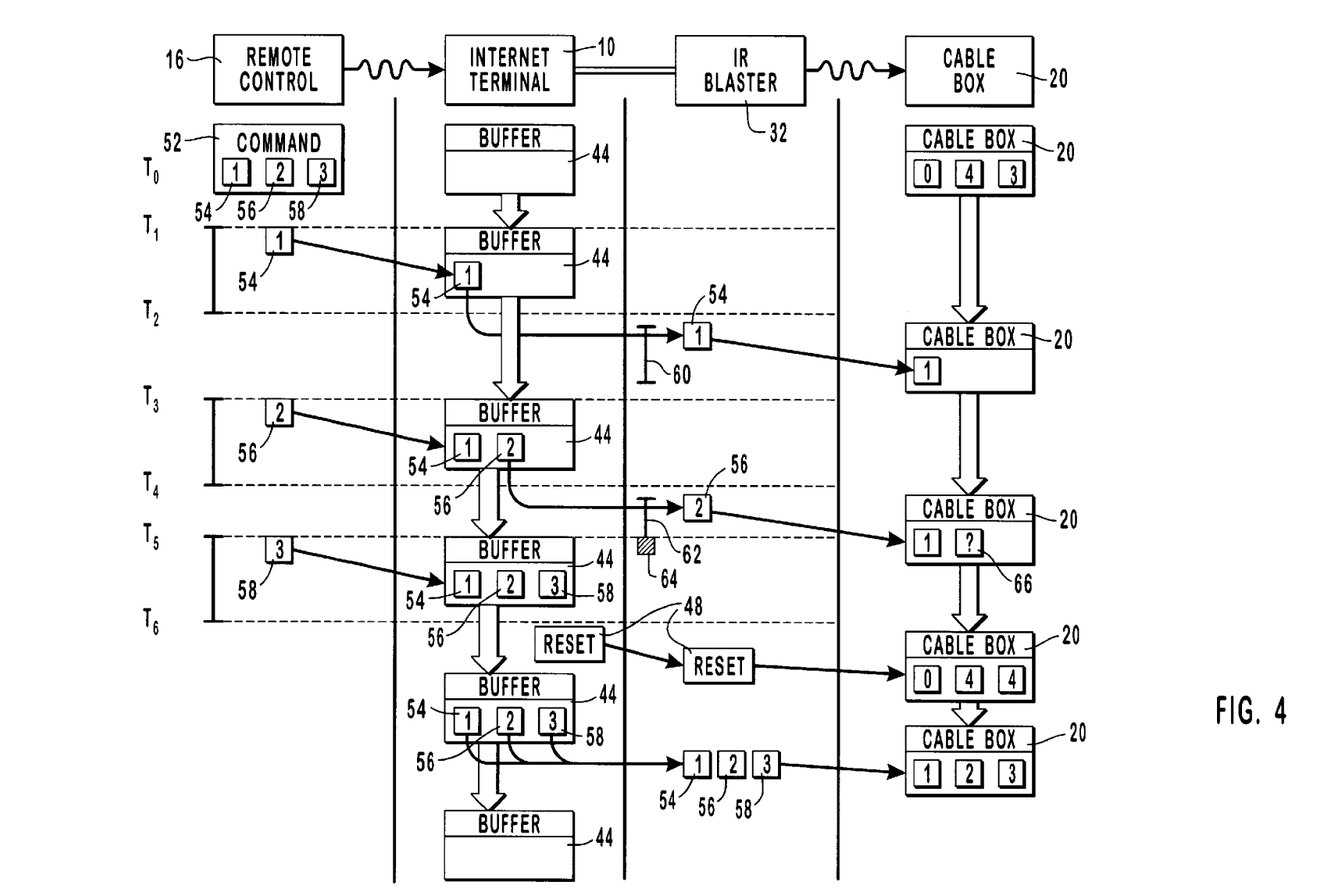
FIG. 4 illustrates one example of the transmission of data in a remote control system of the invention.
Figure 5:
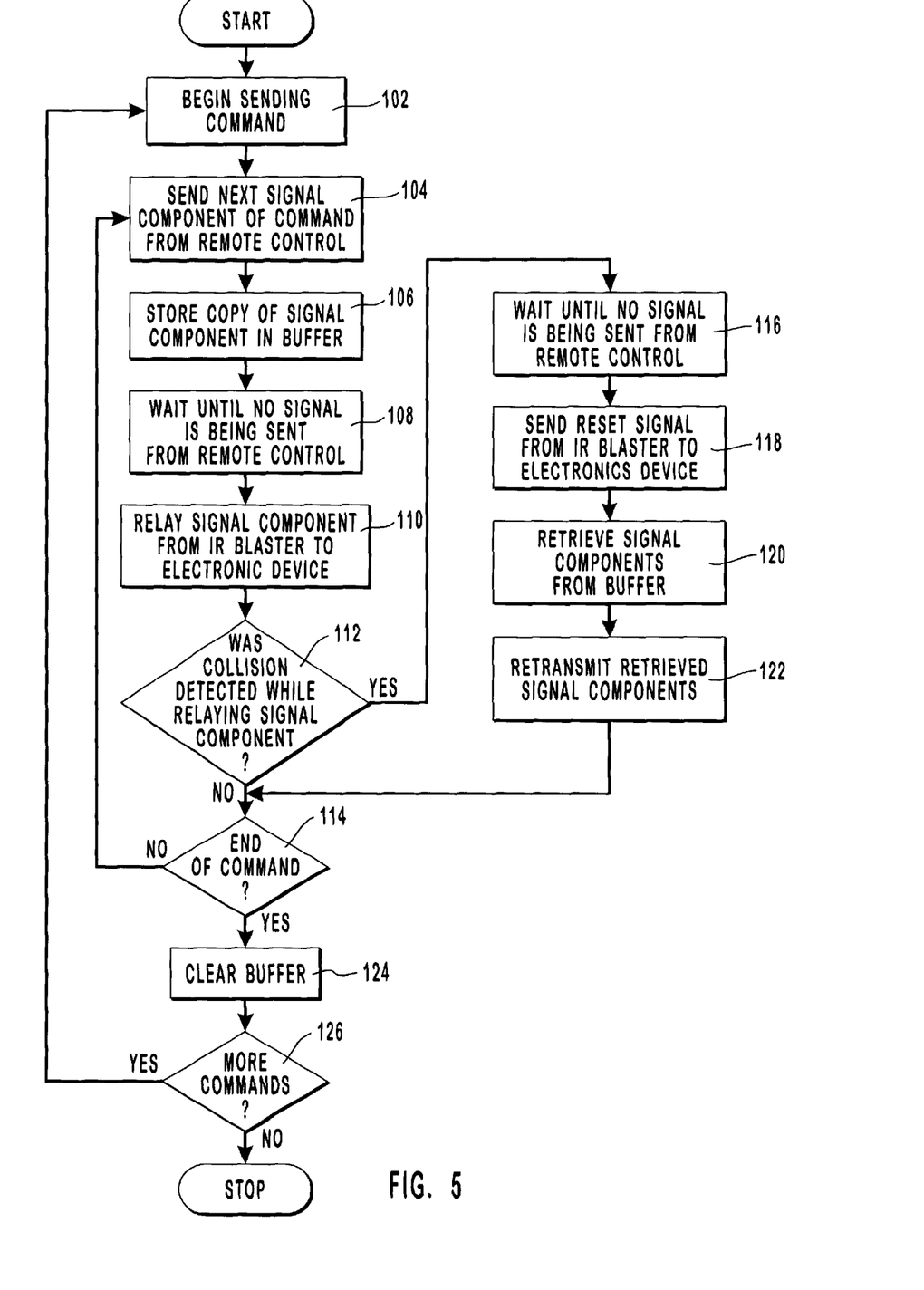
FIG. 5 is a flow diagram showing a method of detecting and resolving interference between IR signals.

A specific example of detecting IR signal interference and resolving the interference may be described by referring to FIGS. 4 and 5. FIG. 4 illustrates transmission of information from remote control device 16 to Internet terminal 10, then to IR blaster 32, and finally to cable box 20. FIG. 5 is a flow diagram illustrating steps of one embodiment of the methods of the invention. The command 52 to be sent from remote control device 16 to cable box 20 according to FIG. 4 is a number comprising the digits 1, 2, and 3, representing a television channel to be tuned to by cable box 20. At $T_0$, cable box 20 is already tuned to another television channel, which in this example is channel "43."

Referring to step 102 of FIG. 5, a user begins sending the command from the remote control device. In this example, command 52 of FIG. 4 includes three signal components 54, 56, and 58. Component 46 includes information representing the digit 1, while components 56 and 58 include information representing the digits 2 and 3, respectively. As shown by step 104 of FIG. 5, the user sends the next signal component of the command from the remote control device. Returning to FIG. 4, this step begins at time $T_1$ and ends at time $T_2$, during which time an infrared signal carrying computer readable information representing the digit 1 is transmitted from remote control device 16 to Internet terminal 10.

In step 106 of FIG. 5, a copy of the information carried by the current signal component is stored in the buffer at Internet terminal 10. As shown in FIG. 4, information representing the digit 1 is stored in buffer 44. In step 108 of FIG. 5, the Internet terminal waits until it detects that no signal is being sent from the remote control device. Next, in step 110 the current signal component is sent to IR blaster 32 and is then relayed to cable box 20. Steps 108 and 110 are further illustrated in FIG. 4. In particular, signal component 54 is sent from buffer 44 to IR blaster 32. After time $T_2$, when it is detected that no signal is being sent from remote control device 16, signal component 54 is relayed from IR blaster 32 to cable box 20. As shown in FIG. 4, the signal carrying the signal component 54 is emitted during a duration of time 60. Signal component 46 is then stored at cable box 20 in preparation for receiving the remaining two signal components.

Referring now to FIG. 5, there has been no signal collision or interference detected while the current signal component 54 was being relayed, and the method proceeds from decision block 112 to decision block 114. Since signal components 48 and 50 remain to be sent, the method proceeds from decision block 114 to step 104, and steps 104, 106, 108, and 110 are repeated. As shown in FIG. 4, the process of sending signal component 56, which represents the digit 2, from remote control device 16 begins at time $T_3$ and extends to time $T_4$. The information carried by signal component 56 is stored in buffer 44, which still contains the information encoded in signal component 54. After time $T_4$, signal component 56 is sent to IR blaster 32 and is then relayed to cable box 20 during period of time 62. It is noted that period of time 62 includes time $T_5$, when signal component 58 begins to be sent from remote control device 16. In other words, at time 64, the signal sent from remote control device 16 interferes with the signal sent from IR blaster 32. Accordingly, it is possible that signal component 56 has not been received at cable box 20 due to the signal interference. The information 66 stored at cable box 20 at the end of time period 62 is therefore indeterminate.

Turning now to FIG. 5, the method begins to resolve this potential loss of encoded information by proceeding from decision block 112 to step 116. Step 116 includes waiting until no signal is being sent from remote control device 16. In the example of FIG. 4, step 116 is conducted by waiting until time $T_6$, when signal component 58 is no longer being transmitted from remote control device 16. In the mean time, however, signal component 58 is stored in buffer 44 along with the previously transmitted signal components.

In step 118 of FIG. 5, a reset signal 48, as shown in FIG. 4, is sent from Internet terminal 10 to cable box 20 via IR blaster 32. As disclosed herein, cable box 20 reverts to a known state in response to reset signal 48. In this example, resent signal 48 is a channel up signal that causes cable box 20 to tune to the television channel that is incrementally greater than the previous television channel. In particular, cable box 20 turns to channel "44" from the previously tuned channel, "43." As a result, the information carried in signal component 54, which is already stored in a buffer at cable box 20, is purged.

In step 120 of FIG. 5, the Internet terminal retrieves the signal components stored in buffer 44, which are then retransmitted to the cable box in step 122. Steps 120 and 122 are further illustrated in FIG. 4, in which signal components 54, 56, and 58, are retrieved from buffer 44 and are transmitted to cable box 20 via IR blaster 32. At this point, cable box 20 has received all three digits of command 52 and has been caused to tune to television channel "123." Referring to FIG. 5, the method proceeds to decision block 114 and then to step 124, since the entire command has been transmitted to the cable box. Buffer 44 is then cleared in step 124 as further illustrated in FIG. 4. If another command is to be sent from the remote control device, the method proceeds from decision block 126 to step 102 as shown in FIG. 5.

In view of the foregoing, the present invention allows a single remote control device to control multiple consumer electronics devices regardless of interference between primary signals emitted from the remote control device and relayed signals transmitted from an IR emitter. The principles of the invention may be applied to remote control systems wherein a third consumer electronics device, or any other desired number of consumer electronics devices, are also controlled by the remote control device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system including a remote control device, a first consumer electronics device controllable by the remote control device, and a signal relay device for relaying signals from the remote control device to a second consumer electronics device, a method for resolving interference between primary signals from the remote control device and relayed signals from the signal relay device, the method comprising the steps of:

transmitting a primary signal from the remote control device to the first consumer electronics device;

determining, by the first consumer electronics device, that the primary signal in no longer being transmitted; and transmitting a relayed signal from the signal relay device to the second consumer electronics device.

2. A method as defined in claim 1, wherein the step of transmitting a relayed signal from the signal relay device to the second consumer electronics device is conducted for a first time during the step of transmitting the primary signal and is later conducted for a second time after the step of determining that the primary signal is no longer being transmitted.

3. A method as defined in claim 2, further comprising the step of detecting, by the first consumer electronics device, that the relayed signal has been transmitted at the same time as the primary signal.

4. A method as defined in claim 2, wherein the primary signal interferes with the relayed signal that is transmitted upon conducting for the first time the step of transmitting the relayed signal from the signal relay device to the second consumer electronics device, such that the second consumer electronics device does not respond in the same manner as the second consumer electronics device would have responded in the absence of interference by the primary signal.

5. In a system including a remote control device, a first consumer electronics device controllable by the remote control device, and a signal relay device for relaying signals from the remote control device to a second consumer electronics device, a method for resolving interference between primary signals from the remote control device and relayed signals from the signal relay device, the method comprising the steps of:

transmitting a relayed signal from the signal relay device to the second consumer electronics device;

transmitting a primary signal from the remote control device to the first consumer electronics device at the same time as the relayed signal is being transmitted from the signal relay device to the second consumer electronics device;

detecting, by the first consumer electronics device, that the relayed signal and the primary signal have been simultaneously transmitted;

determining, by the first consumer electronics device, that the primary signal in no longer being transmitted; and retransmitting the relayed signal from the signal relay device to the second consumer electronics device.

6. A method as defined in claim 5, further comprising the step of transmitting a reset signal from the signal relay device to the second consumer electronics device before the step of retransmitting the relayed signal, the reset signal placing the second consumer electronics device in condition to respond to the retransmitted relayed signal.

7. In a system including a remote control device, a first consumer electronics device controllable by the remote control device, and a signal relay device for relaying signals from the remote control device to a second consumer electronics device, a method for resolving interference between primary signals from the remote control device and relayed signals from the signal relay device, the method comprising the steps of:

transmitting, from the remote control device to the first consumer electronics device, a first signal component of a command for executing a function at the second consumer electronics device, the command comprising at least the first signal component and a second signal component;

relaying the first signal component from the signal relay device to the second consumer electronics device;

during the step of relaying the first signal component, transmitting the second signal component from the remote control device to the first consumer electronics device;

detecting, by the first consumer electronics device, that the second signal component has been transmitted at the same time that the first signal component has been relayed;

determining that the second signal component is no longer being transmitted;

relaying again the first signal component from the signal relay device to the second consumer electronics device; and relaying the second signal component from the signal relay device to the second consumer electronics device.

8. A method as defined in claim 7, further comprising, before the step of relaying again the first signal, the step of sending a reset signal from the signal relay device to the second consumer electronics device, the reset signal placing the second consumer electronics device in a condition such that the function is executed after the subsequent steps of relaying again the first signal and relaying the second signal have been conducted.

9. A method as defined in claim 8, wherein the reset signal causes the second consumer electronics device to change television channels.

10. A method as defined in claim 9, wherein the reset signal comprises a channel-up code.

11. A method as defined in claim 9, wherein the reset signal comprises a channel-down code.

12. A method as defined in claim 8, wherein the reset signal causes the second consumer electronics device to purge any signal components of the command stored in a buffer at the second consumer electronics device.

13. A method as defined in claim 7, wherein the function of the second consumer electronics device comprises the second consumer electronics device tuning to a selected television channel, each of the first signal component and the second signal component representing a digit of the selected television channel.

14. A method as defined in claim 7, wherein the first signal component and the second signal component are IR signals.

15. A method as defined in claim 7, wherein the first signal component and the second signal component are RF signals.

16. An entertainment system comprising:

a remote control device;

a signal relay device for transmitting relayed signals to a second consumer electronics device, the relayed signals corresponding to primary signals transmitted by the remote control device;

a first consumer electronics device controllable by the remote control device, the first consumer electronics device receiving the primary signals transmitted by the remote control device, the first consumer electronics device including:

means for detecting when one of the primary signals is being transmitted at the same time that one of the relayed signals is being transmitted;

means for determining when said one of the primary signals is no longer being transmitted; and retransmission means for retransmitting said one of the relayed signals when said one of the primary signals is no longer being transmitted.

17. An entertainment system as defined in claim 16, wherein the first consumer electronics device further comprises means for initiating transmission of the relayed signals by the signal relay device in response to the first consumer electronics device receiving the primary signals.

18. An entertainment system as defined in claim 16, wherein the first consumer electronics device further comprises means for initiating transmission of a reset signal from the signal relay device to the second consumer electronics device before said one of the relayed signals is retransmitted by the retransmission means, the reset signal placing the second consumer electronics device in condition to respond to said one of the relayed signals.

19. An entertainment system as defined in claim 16, wherein the signal relay device comprises an infrared emitter electrically connected to the first consumer electronics device.

20. An entertainment system as defined in claim 19, wherein the infrared emitter is configured and positioned to control functions of the second consumer electronics device and at least a third consumer electronics device.

21. An entertainment system as defined in claim 16, wherein the first consumer electronics device comprises an Internet terminal.

22. An entertainment system as defined in claim 21, further comprising a television, wherein the television is capable of displaying information received from the internet terminal and television programming received from the second consumer electronics device.

23. A computer program product, residing at a first consumer electronics device, for implementing a method of resolving interference between primary signals emitted from a remote control device and relayed signals transmitted from a signal relay device to a second consumer electronics device, the computer program product comprising:

a computer-readable medium carrying computer-executable instructions for implementing said method, wherein said computer-executable instructions comprise:

program code means for recognizing that one of the primary signals is being emitted at the same time that one of the relayed signals is being transmitted;

program code means for determining when said one of the primary signals is no longer being transmitted; and program code means for initiating retransmission of said one of the relayed signals to the second consumer electronics device when said one of the primary signals is no longer being transmitted.

24. A computer program product as defined in claim 23, wherein the computer-executable instructions further comprise program code means for initiating transmission of the relayed signals by the signal relay device in response to the primary signals emitted from the remote control device.

25. A computer program product as defined in claim 24, wherein the computer-executable instructions further comprise program code means for selecting a format of the relayed signals, the format being compatible with the second consumer electronics device.

26. A computer program product as defined in claim 23, wherein the computer-executable instructions further comprise program code means for initiating transmission of a reset signal from the remote control device to the second consumer electronics device prior to the initiation of retransmission of said one of the relayed signals by the program code means for initiating retransmission, the reset signal placing the second consumer electronics device in condition to respond to the retransmitted relayed signal.

27. A computer program product as defined in claim 23, wherein said one of the primary signals and said one of the relayed signals are IR signals.

* * * * *